United States Patent
Sakaguchi et al.

(10) Patent No.: US 7,794,315 B2
(45) Date of Patent: Sep. 14, 2010

(54) ROLE PLAY SYSTEM

(75) Inventors: Hironobu Sakaguchi, Honolulu, HI (US); Takehiro Kaminagayoshi, Tokyo (JP)

(73) Assignee: Microsoft Corporation, Redmond, WA (US)

( * ) Notice: Subject to any disclaimer, the term of this patent is extended or adjusted under 35 U.S.C. 154(b) by 1071 days.

(21) Appl. No.: 11/221,793

(22) Filed: Sep. 9, 2005

(65) Prior Publication Data

US 2007/0060343 A1    Mar. 15, 2007

(51) Int. Cl.
*A63F 13/00* (2006.01)
(52) U.S. Cl. .............................................. 463/9; 463/1
(58) Field of Classification Search ...................... 463/1, 463/9, 29
See application file for complete search history.

(56) References Cited

U.S. PATENT DOCUMENTS

| | | | | |
|---|---|---|---|---|
| 6,139,434 A | * | 10/2000 | Miyamoto et al. | 463/32 |
| 6,758,756 B1 | * | 7/2004 | Horigami et al. | 463/43 |
| 2005/0187023 A1 | * | 8/2005 | Miyamoto et al. | 463/43 |
| 2006/0205456 A1 | * | 9/2006 | Bentz et al. | 463/1 |

OTHER PUBLICATIONS

"Super Mario 64" Game user manaul, release date in U.S. establised as of Sep. 29, 1996. http://downloads.planetmirror.com/pub/replacementdocs/Super_Mario_64_-_Manual_-_N64.pdf.*

"Madden 2005" Game user manual, release date in U.S. established as of Sep. 7, 2004. http://downloads.plantermirrorcom/pub/replacementdocs/Madden_2005_-_Manual_-_Playstation2.pdf.*

"X-Men Legends" Game user manual, release date in U.S. established as of Sep. 21, 2004. http://downloads.planetmirrorcom/pub/replacementdocs/X_Men_Legends_-_Manual_-_Xbox.pdf.*

X-Men Legends "A breath of fresh air in to the X-men Universe" http://www.gamefaqs.com/console/xbox/review/R80178,html.*

"X-Men Legends" Game user manual, release date established as of Sep. 21, 2004. http://downloads.planetmirror.com/pub/replacementdocs/X_Men_Legends_-_Manual_-_Xbox.pdf.*

"Dynasty Warriors" Game user manual, release date established as of Feb. 24, 2005. http://downloads.planetmirror.com/pub/replacementdocs/Dynasty_Warriors_5_-_Manual_-_PS2.pdf.*

* cited by examiner

*Primary Examiner*—John M Hotaling
*Assistant Examiner*—Eric M Thomas
(74) *Attorney, Agent, or Firm*—Lee & Hayes, PLLC (57) ABSTRACT

A video game system and method is described in which a player-controlled icon in a map scene represents a group or party of characters, and in response to the icon entering a location on the map scene, automatically dispersing the icon into multiple icons representing the various characters. Upon dispersing, the various characters may automatically move to different areas of the location based on individual character preferences. The player may choose to control one of the characters in the location and interact with one or more characters/objects in the location. The interaction may be recorded as it occurs, and the player may switch control to a different character and play the same interaction from a second character's point of view. Under the second character's point of view, the original interaction and/or its outcome may be changed.

17 Claims, 10 Drawing Sheets

ROLE PLAY SYSTEM

BACKGROUND

Computerized role-playing games (RPGs) have secured their place in the video game industry as one of the most popular video game types. The attraction typically comes from a mixture of the overall story (or stories) being told in the game, and the underlying game mechanics (e.g., how the characters are improved as the game progresses, how battles are conducted, etc.).

In some RPGs, the player may be given control over the main character in the story, and additional side characters may join the main character as the story progresses. The side characters may be important to the story as it unfolds, and developers of RPGs typically give considerable thought and attention to the characters (both main and side characters), giving them unique appearances and back stories explaining their history.

Typical RPGs, however, continue to focus on the main character. Some RPGs use a map scene to depict a world in which the game takes place, and the main character is displayed in the map scene. The player may move their main character through the environment shown in the map scene, and may interact with the various creatures, characters and/or objects in the scene. If the main character is accompanied by one or more side characters, forming a party, the side characters do not play significant roles in the map scene, and are not given much attention. When the main character (or party) moves through the map scene and enters a location in the scene, such as a town, the player remains in control of the main character, again largely ignoring the side characters in the party.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

As described herein, an RPG may display a primary character on a map scene, together with an environment in which the game takes place, and one or more creatures, characters and/or objects with which the player's character may interact. The primary character displayed in the map scene may stand as a representative of an entire party of characters. In some aspects, each character in the party is programmed to have individual characteristics, such as interests, aversions, appearance, equipment, etc. that may have an effect on other creatures/characters/objects in the game.

The player may control the movements of the primary character displayed in the map scene, and upon entering a location on the map scene (e.g., entering a town), the various characters in the party may automatically disperse through the location in accordance with their individual characteristics.

The player may also be given an option to select one of the characters in the party for control while in the location. After a character is selected, the player may then navigate the location and interact with the other creatures/characters/objects in the location using the selected character, and these interactions may depend on the selected character's characteristics (together with characteristics of the creatures/characters/objects being interacted with).

The player may also be given an option to switch control from the selected character to a different character from the party. By switching control, the player may take advantage of the characteristics of the different character to interact with the game's creatures/characters/objects and handle different situations. In some aspects, the player may use the different character to continue an interaction that was initiated by the first selected character.

The game may be programmed to record the movements and actions of the player's selected character during an interaction, and may give the player the option of switching to a different character and replaying the same interaction from the different character's point of view. In this manner, a player may appear to have traveled backwards in time within the game, and may use the different character to alter the first selected character's interaction.

These and other aspects may help provide players with a more enjoyable experience, and are described in greater detail herein.

DETAILED DESCRIPTION

In the following description of the various aspects, reference is made to the accompanying drawings, which form a part hereof, and in which is shown by way of illustration various features described herein may be practiced. It is to be understood that other embodiments may be used and structural and functional modifications may be made.

Figure 1:
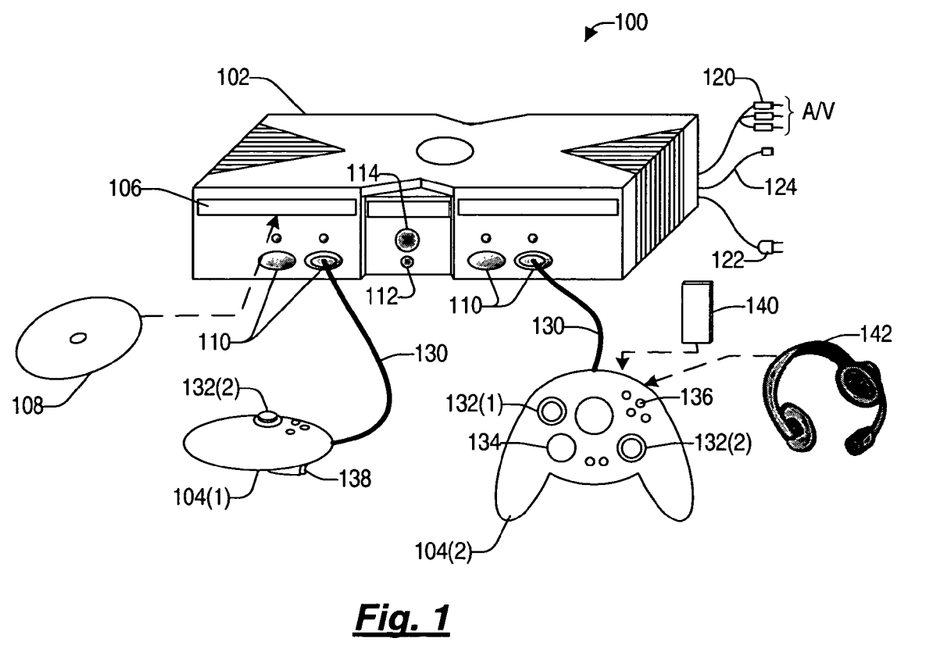
FIG. 1 illustrates a gaming system that may implement one or more of the features described herein.

FIG. 1 illustrates an example of a suitable gaming system environment 100 on which computer games, video games, and or other electronic games (collectively referred to herein as computer games) may be played. The gaming system environment 100 is only one example of a suitable computing environment and is not intended to suggest any limitation as to the scope of use or functionality of the features described herein. Neither should the gaming system environment 100 be interpreted as having any dependency or requirement relating to any one or combination of components illustrated in the illustrative operating gaming system environment 100.

Aspects described herein are operational with numerous other general purpose or special purpose computing system environments or configurations. Examples of well known computing systems, environments, and/or configurations that may be suitable for use include, but are not limited to, personal computers; server computers; portable and hand-held devices such as personal digital assistants (PDAs), tablet PCs or laptop PCs; multiprocessor systems; microprocessor-based systems; set top boxes; programmable consumer electronics; network PCs; minicomputers; mainframe computers; electronic game consoles, distributed computing environments that include any of the above systems or devices; and the like.

Aspects herein may be described in the general context of computer-executable instructions, such as program modules, being executed by a computer. Generally, program modules include routines, programs, objects, components, data structures, etc. that perform particular tasks or implement particular abstract data types. The features described herein may also be practiced in distributed computing environments where tasks are performed by remote processing devices that are linked through a communications network. In a distributed computing environment, program modules may be located in both local and remote computer storage media including memory storage devices.

FIG. 1 shows an exemplary gaming system 100. Gaming system 100 may include a game console 102 and multiple controllers, as represented by controllers 104(1) and 104(2). The game console 102 is equipped with an internal hard disk drive and a portable media drive 106 that supports various forms of portable storage media as represented by optical storage disc 108. Examples of suitable portable storage media include DVD, CD-ROM, game discs, and so forth.

Game console 102 has four slots 110 on its front face to support up to four controllers, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108.

Game console 102 may connect to a television or other display (not shown) via A/V interfacing cables 120. A power cable 122 provides power to the game console. Game console 102 may further be configured with broadband network capabilities, as represented by the cable or modem connector 124 to facilitate access to a network, such as the Internet.

Each controller 104 may be coupled to the game console 102 via a wire or wireless interface. In the illustrated implementation, the controllers are USB (Universal Serial Bus) compatible and are connected to the console 102 via USB cables 130. Controller 102 may be equipped with any of a wide variety of user interaction mechanisms. As illustrated in FIG. 1, each controller 104 is equipped with two thumbsticks 132(1) and 132(2), a D-pad 134, buttons 136 (e.g., 'A', 'B', 'X', 'Y'), and two triggers 138. These mechanisms are merely representative, and other known gaming mechanisms may be substituted for or added to those shown in FIG. 1.

A memory unit (MU) 140 may be inserted into the controller 104 to provide additional and portable storage. Portable memory units enable users to store game parameters and user accounts, and port them for play on other consoles. In the described implementation, each controller is configured to accommodate two memory units 140, although more or less than two units may be employed in other implementations. A headset 142 may be connected to the controller 104 or game console 102 to provide audio communication capabilities. Headset 142 may include a microphone for audio input and one or more speakers for audio output.

Gaming system 100 is capable of playing, for example, games, music, and videos. With the different storage offerings, titles can be played from the hard disk drive or the portable medium 108 in drive 106, from an online source, or from a memory unit 140. For security, in some embodiments executable code can only be run from the portable medium 108. A sample of what gaming system 100 is capable of playing include game titles played from CD and DVD discs, from the hard disk drive, or from an online source; digital music played from a CD in the portable media drive 106, from a file on the hard disk drive (e.g., Windows Media Audio (WMA) format), or from online streaming sources; and digital audio/video played from a DVD disc in the portable media drive 106, from a file on the hard disk drive (e.g., Active Streaming Format), or from online streaming sources.

Figure 2:
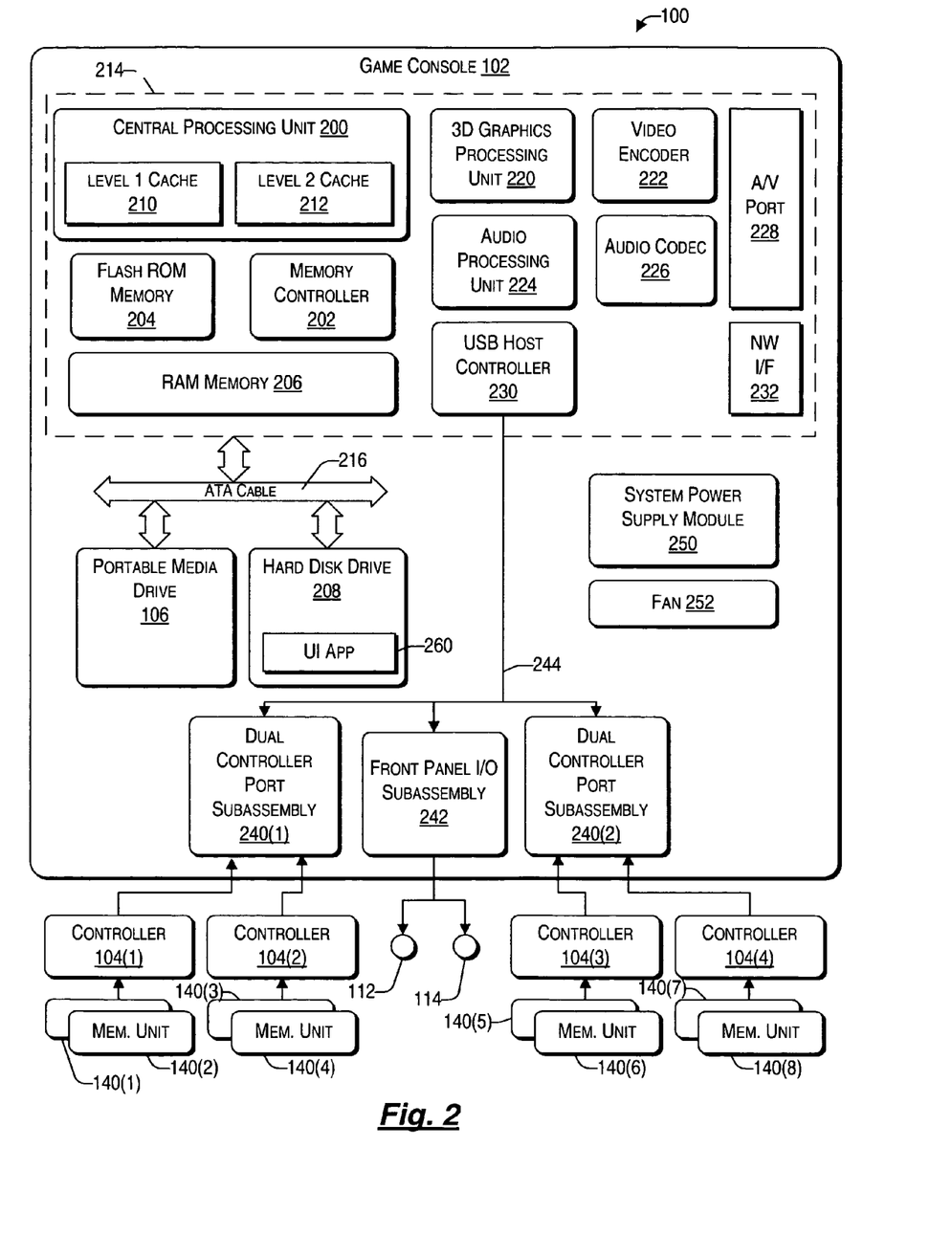
FIG. 2 illustrates a block diagram of the gaming system shown in FIG. 1.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

As one suitable implementation, the CPU 200, memory controller 202, ROM 204, and RAM 206 are integrated onto a common module 214. In this implementation, ROM 204 is configured as a flash ROM that is connected to the memory controller 202 and a ROM bus (not shown). RAM 206 is configured as multiple DDR SDRAM (Double Data Rate Synchronous Dynamic RAM) that are independently controlled by the memory controller 202 via separate buses (not shown). The hard disk drive 208 and portable media drive 106 are connected to the memory controller via the PCI bus and an ATA (AT Attachmnent) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., Internet, home network, etc.) and may be any of a wide variety of various wire or wireless interface components including an Ethernet card, a modem, a Bluetooth module, a cable modem, and the like.

The game console 102 has two dual controller support subassemblies 240(1) and 240(2), with each subassembly supporting two game controllers 104(1)-104(4). A front panel I/O subassembly 242 supports the functionality of the power button 112 and the eject button 114, as well as any LEDs (light emitting diodes) or other indicators exposed on the outer surface of the game console. The subassemblies 240(1), 240 (2), and 242 are coupled to the module 214 via one or more cable assemblies 244.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202.

A system power supply module 250 provides power to the components of the gaming system 100. A fan 252 cools the circuitry within the game console 102.

The game console 102 implements a uniform media portal model that provides a consistent user interface and navigation hierarchy to move users through various entertainment areas. The portal model offers a convenient way to access content from multiple different media types—game data, audio data, and video data—regardless of the media type inserted into the portable media drive 106.

To implement the uniform media portal model, a console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console.

The gaming system 100 may be operated as a standalone system by simply connecting the system to a television or other display. In this standalone mode, the gaming system 100 allows one or more players to play games, watch movies, or listen to music. However, with the integration of broadband connectivity made available through the network interface 232, the gaming system 100 may further be operated as a participant in a larger network gaming community. This network gaming environment is described next.

Figure 3:
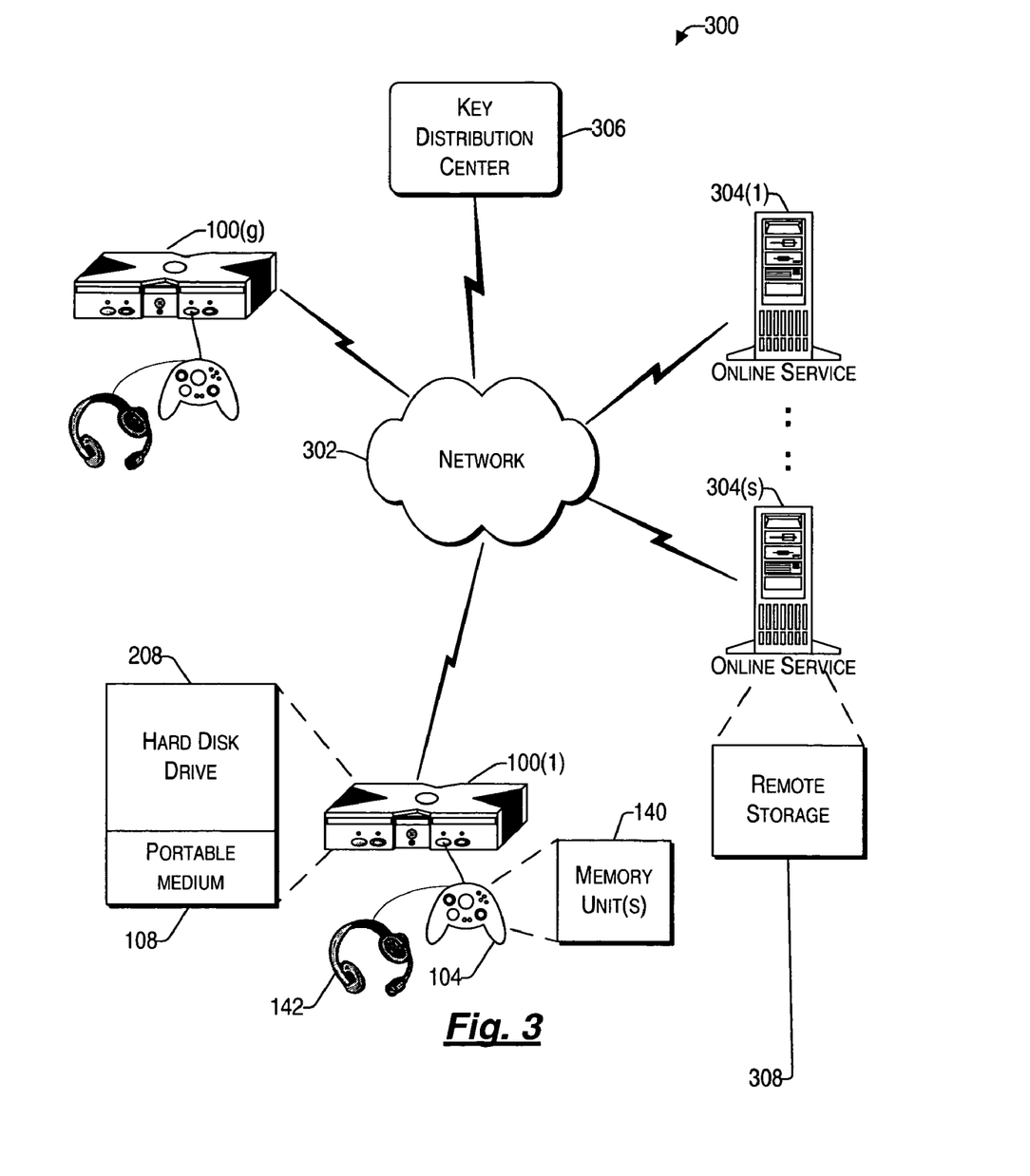
FIG. 3 illustrates a block diagram of a network gaming system that may implement one or more of the features described herein.

FIG. 3 shows an exemplary network gaming environment 300 that interconnects multiple gaming systems 100(1), ..., 100(g) via a network 302. The network 302 represents any of a wide variety of data communications networks. It may include public portions (e.g., the Internet) as well as private portions (e.g., a residential Local Area Network (LAN)), as well as combinations of public and private portions. Network 302 may be implemented using any one or more of a wide variety of conventional communications media including both wired and wireless media. Any of a wide variety of communications protocols can be used to communicate data via network 302, including both public and proprietary protocols. Examples of such protocols include TCP/IP, IPX/SPX, NetBEUI, etc.

In addition to gaming systems 100, one or more online services 304(1), ..., 304(s) may be accessible via the network 302 to provide various services for the participants, such as hosting online games, serving downloadable music or video files, hosting gaming competitions, serving streaming audio/video files, and the like. The network gaming environment 300 may further involve a key distribution center 306 that plays a role in authenticating individual players and/or gaming systems 100 to one another as well as online services 304. The distribution center 306 distributes keys and service tickets to valid participants that may then be used to form games amongst multiple players or to purchase services from the online services 304.

The network gaming environment 300 introduces another memory source available to individual gaming systems 100—online storage. In addition to the portable storage medium 108, the hard disk drive 208, and the memory unit(s) 140, the gaming system 100(1) can also access data files available at remote storage locations via the network 302, as exemplified by remote storage 308 at online service 304(s).

Figure 4:
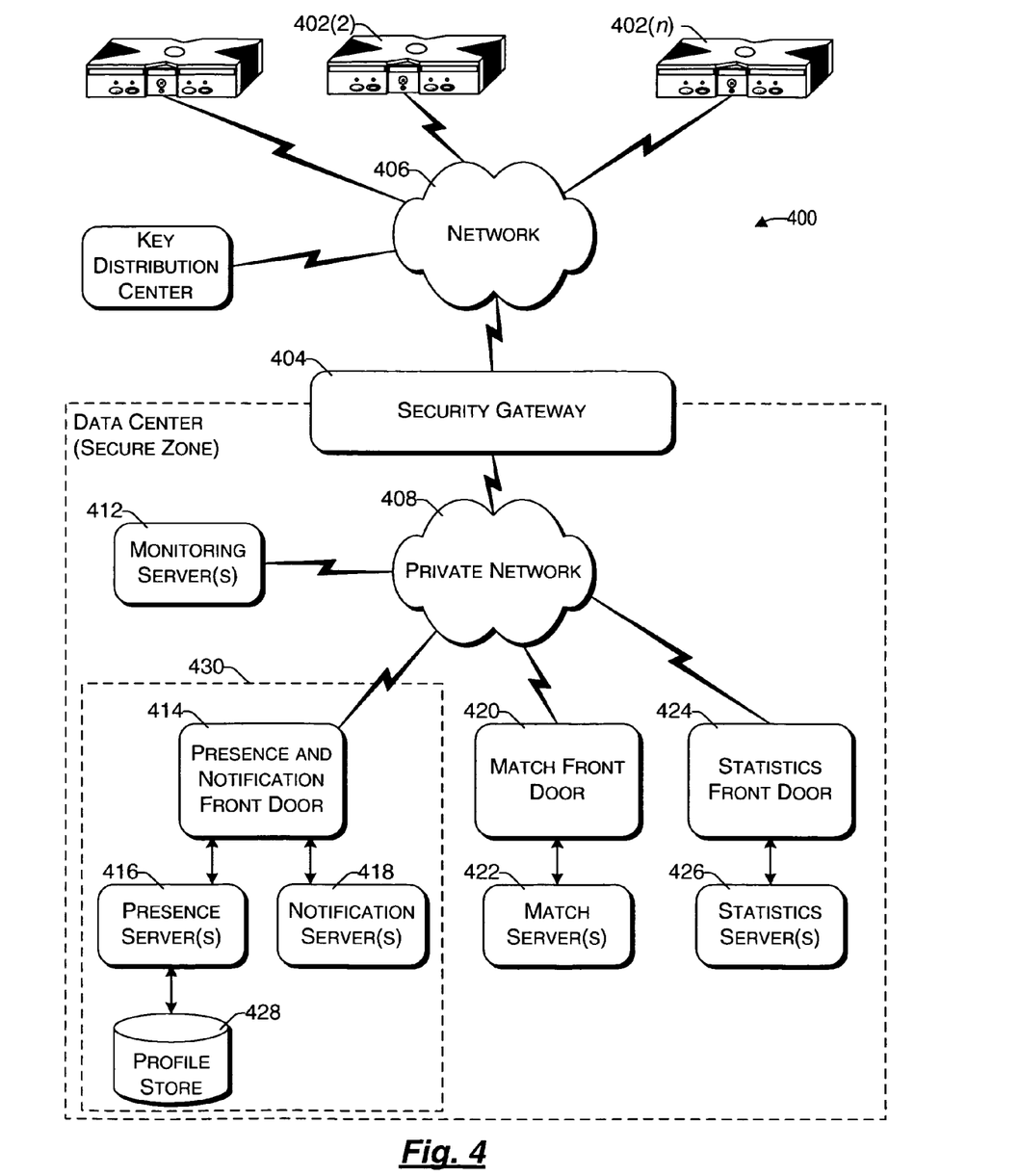
FIG. 4 illustrates another block diagram of an online gaming environment that may implement one or more of the features described herein.

FIG. 4 is a block diagram of another illustrative online gaming environment 400, e.g. XBOX® LIVE by Microsoft Corporation of Redmond, Wash. Multiple game consoles 402 (1), 402(2), ..., 402(n) are coupled to a security gateway 404 via a network 406. Each game console 402 can be, for example, a game console 102 of FIG. 1 or FIG. 2. Network 406 represents any one or more of a variety of conventional data communications networks. Network 406 will typically include packet switched networks, but may also include circuit switched networks. Network 406 can include wire and/or wireless portions. In one exemplary implementation, network 406 includes the Internet and may optionally include one or more local area networks (LANs) and/or wide area networks (WANs). At least a part of network 406 is a public network, which refers to a network that is publicly-accessible. Virtually anyone can access the public network.

In some situations, network 406 includes a LAN (e.g., a home network), with a routing device situated between game console 402 and security gateway 404. This routing device may perform network address translation (NAT), allowing the multiple devices on the LAN to share the same IP address on the Internet, and also operating as a firewall to protect the device(s) on the LAN from access by malicious or mischievous users via the Internet.

Security gateway 404 operates as a gateway between public network 406 and a private network 408. Private network 408 can be any of a wide variety of conventional networks, such as a local area network. Private network 408, as well as other devices discussed in more detail below, is within a data center 410 that operates as a secure zone. Data center 410 is made up of trusted devices communicating via trusted communications. Thus, encryption and authentication within secure zone 410 is not necessary. The private nature of network 408 refers to the restricted accessibility of network 408—access to network 408 is restricted to only certain individuals (e.g., restricted by the owner or operator of data center 410).

Security gateway 404 is a cluster of one or more security gateway computing devices. These security gateway computing devices collectively implement security gateway 404. Security gateway 404 may optionally include one or more conventional load balancing devices that operate to direct requests to be handled by the security gateway computing devices to appropriate ones of those computing devices. This directing or load balancing is performed in a manner that attempts to balance the load on the various security gateway computing devices approximately equally (or alternatively in accordance with some other criteria).

Also within data center 410 are: one or more monitoring servers 412; one or more presence and notification front doors 414, one or more presence servers 416, one or more notification servers 418, and a profile store 428 (collectively implementing a presence and notification service or system 430); one or more match front doors 420 and one or more match servers 422 (collectively implementing a match service); and one or more statistics front doors 424 and one or more statistics servers 426 (collectively implementing a statistics service). The servers 416, 418, 422, and 426 provide services to game consoles 402, and thus can be referred to as service devices. Other service devices may also be included in addition to, and/or in place of, one or more of the servers 416, 418, 422, and 426. Additionally, although only one data center is shown in FIG. 4, alternatively multiple data centers may exist with which game consoles 402 can communicate. These data centers may operate independently, or alternatively may operate collectively (e.g., to make one large data center available to game consoles 102,402).

Game consoles 402 are situated remotely from data center 410, and access data center 410 via network 406. A game console 402 desiring to communicate with one or more devices in the data center logs in to the data center and establishes a secure communication channel between the console 402 and security gateway 404. Game console 402 and security gateway 404 encrypt and authenticate data packets being passed back and forth, thereby allowing the data packets to be securely transmitted between them without being understood by any other device that may capture or copy the data packets without breaking the encryption. Each data packet communicated from game console 402 to security gateway 404, or from security gateway 404 to game console 402 can have data embedded therein. This embedded data is referred to as the content or data content of the packet. Additional information may also be inherently included in the packet based on the packet type (e.g., a heartbeat packet).

The secure communication channel between a console 402 and security gateway 404 is based on a security ticket. Console 402 authenticates itself and the current user(s) of console 402 to a key distribution center 428 and obtains, from key distribution center 428, a security ticket. Console 402 then uses this security ticket to establish the secure communication channel with security gateway 404. In establishing the secure communication channel with security gateway 404, the game console 402 and security gateway 404 authenticate themselves to one another and establish a session security key that is known only to that particular game console 402 and the security gateway 404. This session security key is used to encrypt data transferred between the game console 402 and the security gateway cluster 404, so no other devices (including other game consoles 402) can read the data. The session security key is also used to authenticate a data packet as being from the security gateway 404 or game console 402 that the data packet alleges to be from. Thus, using such session security keys, secure communication channels can be established between the security gateway 404 and the various game consoles 402.

Once the secure communication channel is established between a game console 402 and the security gateway 404, encrypted data packets can be securely transmitted between the two. When the game console 402 desires to send data to a particular service device in data center 410, the game console 402 encrypts the data and sends it to security gateway 404 requesting that it be forwarded to the particular service device(s) targeted by the data packet. Security gateway 404 receives the data packet and, after authenticating and decrypting the data packet, encapsulates the data content of the packet into another message to be sent to the appropriate service via private network 408. Security gateway 404 determines the appropriate service for the message based on the requested service(s) targeted by the data packet.

Similarly, when a service device in data center 410 desires to communicate data to a game console 402, the data center sends a message to security gateway 404, via private network 408, including the data content to be sent to the game console 402 as well as an indication of the particular game console 402 to which the data content is to be sent. Security gateway 404 embeds the data content into a data packet, and then encrypts the data packet so it can only be decrypted by the particular game console 402 and also authenticates the data packet as being from the security gateway 404.

Although discussed herein as primarily communicating encrypted data packets between security gateway 404 and a game console 402, alternatively some data packets may be partially encrypted (some portions of the data packets are encrypted while other portions are not encrypted). Which portions of the data packets are encrypted and which are not can vary based on the desires of the designers of data center 410 and/or game consoles 402. For example, the designers may choose to allow voice data to be communicated among consoles 402 so that users of the consoles 402 can talk to one another—the designers may further choose to allow the voice data to be unencrypted while any other data in the packets is encrypted. Additionally, in another alternative, some data packets may have no portions that are encrypted (that is, the entire data packet is unencrypted). It should be noted that, even if a data packet is unencrypted or only partially encrypted, all of the data packet can still be authenticated.

Each security gateway device in security gateway 404 is responsible for the secure communication channel with typically one or more game consoles 402, and thus each security gateway device can be viewed as being responsible for managing or handling one or more game consoles. The various security gateway devices may be in communication with each other and communicate messages to one another. For example, a security gateway device that needs to send a data packet to a game console that it is not responsible for managing may send a message to all the other security gateway devices with the data to be sent to that game console. This message is received by the security gateway device that is responsible for managing that game console and sends the appropriate data to that game console. Alternatively, the security gateway devices may be aware of which game consoles are being handled by which security gateway devices - this may be explicit, such as each security gateway device maintaining a table of game consoles handled by the other security gateway devices, or alternatively implicit, such as determining which security gateway device is responsible for a particular game console based on an identifier of the game console.

Monitoring server(s) 412 operate to inform devices in data center 410 of an unavailable game console 402 or an unavailable security gateway device of security gateway 404. Game consoles 402 can become unavailable for a variety of different reasons, such as a hardware or software failure, the console being powered-down without logging out of data center 410, the network connection cable to console 402 being disconnected from console 402, other network problems (e.g., the LAN that the console 402 is on malfunctioning), etc. Similarly, a security gateway device of security gateway 404 can become unavailable for a variety of different reasons, such as hardware or software failure, the device being powered-down, the network connection cable to the device being disconnected from the device, other network problems, etc.

Each of the security gateway devices in security gateway 404 is monitored by one or more monitoring servers 412, which detect when one of the security gateway devices becomes unavailable. In the event a security gateway device becomes unavailable, monitoring server 412 sends a message to each of the other devices in data center 410 (servers, front doors, etc.) that the security gateway device is no longer available. Each of the other devices can operate based on this information as it sees fit (e.g., it may assume that particular game consoles being managed by the security gateway device are no longer in communication with data center 410 and perform various clean-up operations accordingly). Alternatively, only certain devices may receive such a message from the monitoring server 412 (e.g., only those devices that are concerned with whether security gateway devices are available).

Security gateway 404 monitors the individual game consoles 402 and detects when one of the game consoles 402 becomes unavailable. When security gateway 404 detects that a game console is no longer available, security gateway 404 sends a message to monitoring server 412 identifying the unavailable game console. In response, monitoring server 412 sends a message to each of the other devices in data center 410 (or alternatively only selected devices) that the game console is no longer available. Each of the other devices can then operate based on this information as it sees fit.

Presence server(s) 416 hold and process data concerning the status or presence of a given user logged in to data center 410 for online gaming. Notification server(s) 418 maintains multiple notification queues of outgoing messages destined for a player logged in to data center 410. Presence and notification front door 414 is one or more server devices that operate as an intermediary between security gateway 404 and servers 416 and 418. One or more load balancing devices (not shown) may be included in presence and notification front door 414 to balance the load among the multiple server devices operating as front door 414. Security gateway 404 communicates messages for servers 416 and 418 to the front door 414, and the front door 414 identifies which particular server 416 or particular server 418 the message is to be communicated to. By using front door 414, the actual implementation of servers 416 and 418, such as which servers are responsible for managing data regarding which users, is abstracted from security gateway 404. Security gateway 404 can simply forward messages that target the presence and notification service to presence and notification front door 414 and rely on front door 414 to route the messages to the appropriate one of server(s) 416 and server(s) 418.

Match server(s) 422 hold and process data concerning the matching of online players to one another. An online user is able to advertise a game available for play along with various characteristics of the game (e.g., the location where a football game will be played, whether a game is to be played during the day or at night, the user's skill level, etc.). These various characteristics can then be used as a basis to match up different online users to play games together. Match front door 420 includes one or more server devices (and optionally a load balancing device(s)) and operates to abstract match server(s) 422 from security gateway 404 in a manner analogous to front door 414 abstracting server(s) 416 and server(s) 418.

Statistics server(s) 426 hold and process data concerning various statistics for online games. The specific statistics used can vary based on the game designer's desires (e.g., the top ten scores or times, a world ranking for all online players of the game, a list of users who have found the most items or spent the most time playing, etc.). Statistics front door 426 includes one or more server devices (and optionally a load balancing device(s)) and operates to abstract statistics server (s) 426 from security gateway 404 in a manner analogous to front door 414 abstracting server(s) 416 and server(s) 418.

Thus, it can be seen that security gateway 404 operates to shield devices in the secure zone of data center 410 from the untrusted, public network 406. Communications within the secure zone of data center 410 need not be encrypted, as all devices within data center 410 are trusted. However, any information to be communicated from a device within data center 410 to a game console 402 passes through security gateway cluster 404, where it is encrypted in such a manner that it can be decrypted by only the game console 402 targeted by the information.

One or more features described herein may be embodied in computer-executable instructions (i.e., software) stored in RAM memory 206, non-volatile memory 108, 208, 308, or any other resident memory on game console 102. Generally, software modules include routines, programs, objects, components, data structures, etc. that perform particular tasks or implement particular abstract data types when executed by a processor in a computer or other device. The computer executable instructions may be stored on a computer readable medium such as one or more hard disks 208, removable storage media 108 (e.g., CD-ROM, DVD, disk, etc.), solid state memory, RAM 206, etc. As will be appreciated by one of skill in the art, the functionality of the software modules may be combined or distributed as desired in various embodiments. In addition, the functionality may be embodied in whole or in part in firmware or hardware equivalents such as application specific integrated circuits (ASIC), field programmable gate arrays (FPGA), and the like.

Figure 5:
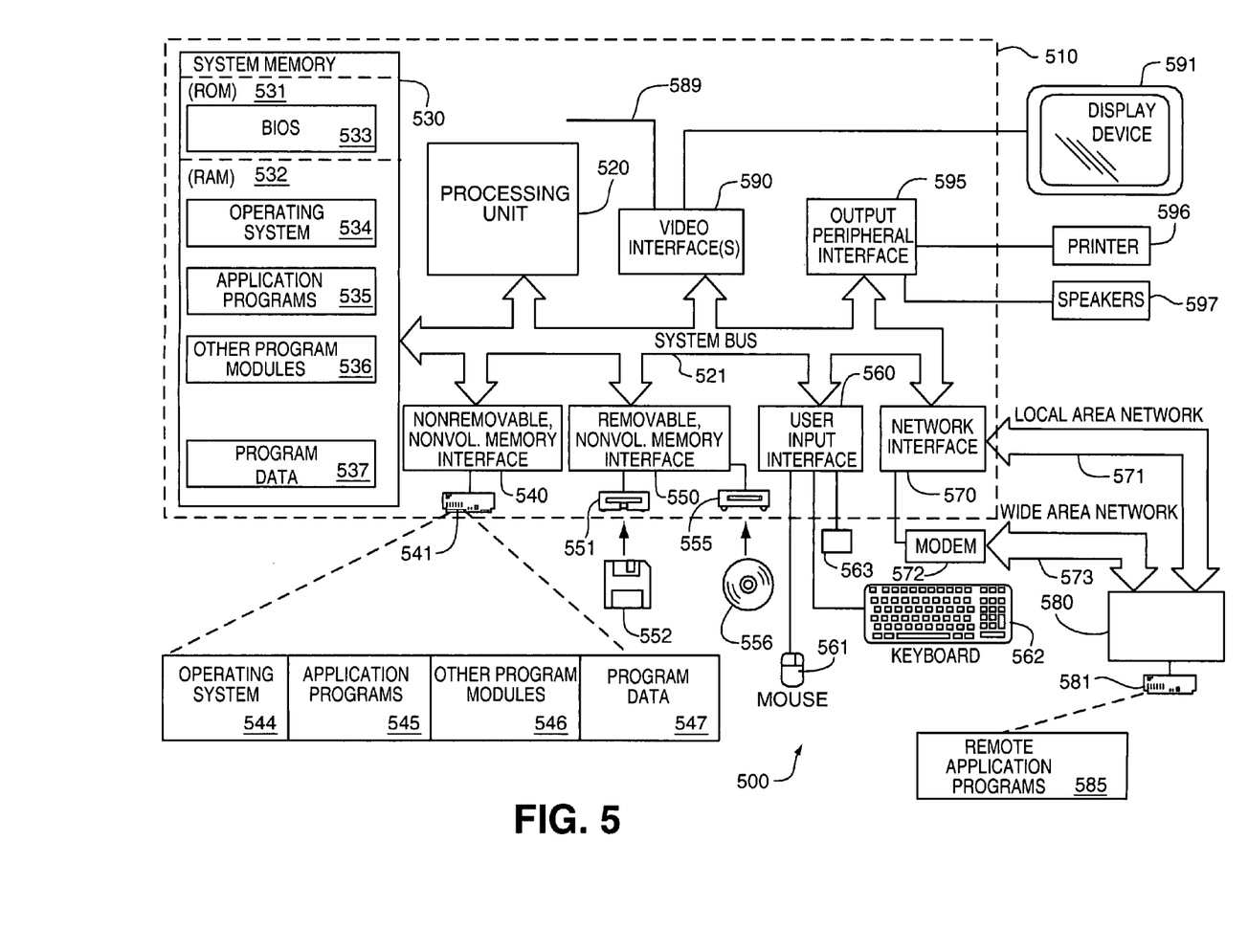
FIG. 5 illustrates a block diagram of a general computing system in which one or more features described herein may be implemented.

Aspects herein are not limited to console computing environments. Indeed, these aspects may also be implemented in video games that operate on personal computers (PC). FIG. 5 illustrates an example of a suitable computing system environment 500 on which the features described herein may be implemented. The computing system environment 500 is only one example of a suitable computing environment and is not intended to suggest any limitation as to the scope of use or functionality of the features described herein. Neither should the computing environment 500 be interpreted as having any dependency or requirement relating to any one or combination of components illustrated in the exemplary operating environment 500.

The features herein are operational with numerous other general purpose or special purpose computing system environments or configurations. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The features herein may be described in the general context of computer-executable instructions, such as program modules, being executed by a computer. Generally, program modules include routines, programs, objects, components, data structures, etc., that perform particular tasks or implement particular abstract data types. The features may also be practiced in distributed computing environments where tasks are performed by remote processing devices that are linked through a communications network. In a distributed computing environment, program modules may be located in both local and remote computer storage media including memory storage devices.

With reference to FIG. 5, an exemplary system for implementing the features described herein includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices (in the singular or the plural), or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Figure 6:
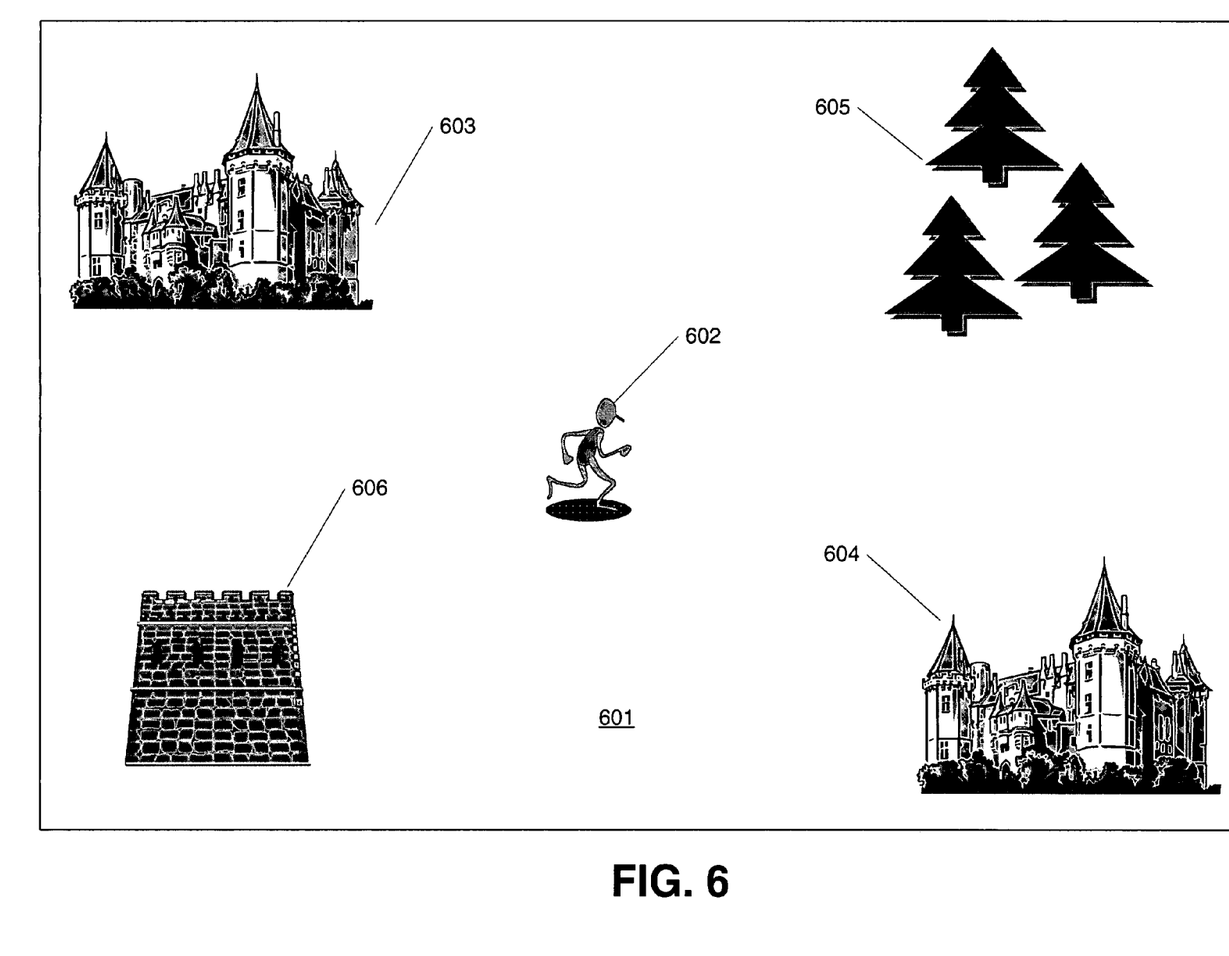
FIG. 6 illustrates an example map scene showing a primary character.

FIG. 6 illustrates an example map scene for a video game, such as an RPG. In the map scene 601, an icon 602 representing the player's character may be displayed. The icon 602 may represent an individual character in the game's story, or it may represent a plurality of characters that form a party. The indicia 602 may be controlled by the player to move about the scene 601 and interact with various elements in the game environment. For example, the map scene 601 may include a plurality of icons representing various locations in the game's world, such as an icon 603 representing a first town, a second icon 604 representing a second town, a third icon 605 representing a forest, and a fourth icon 606 representing a fortification. Any number of icons may be shown on the map scene 601, depending on the story's content.

The character 602 may be moved about the map scene 601 under the player's control. For example, by pressing directional buttons on controller 104, the character 602 may move in a corresponding direction in the scene 601, and may approach one or more locations (e.g., icons 603-606) to enter the location.

Figure 7:
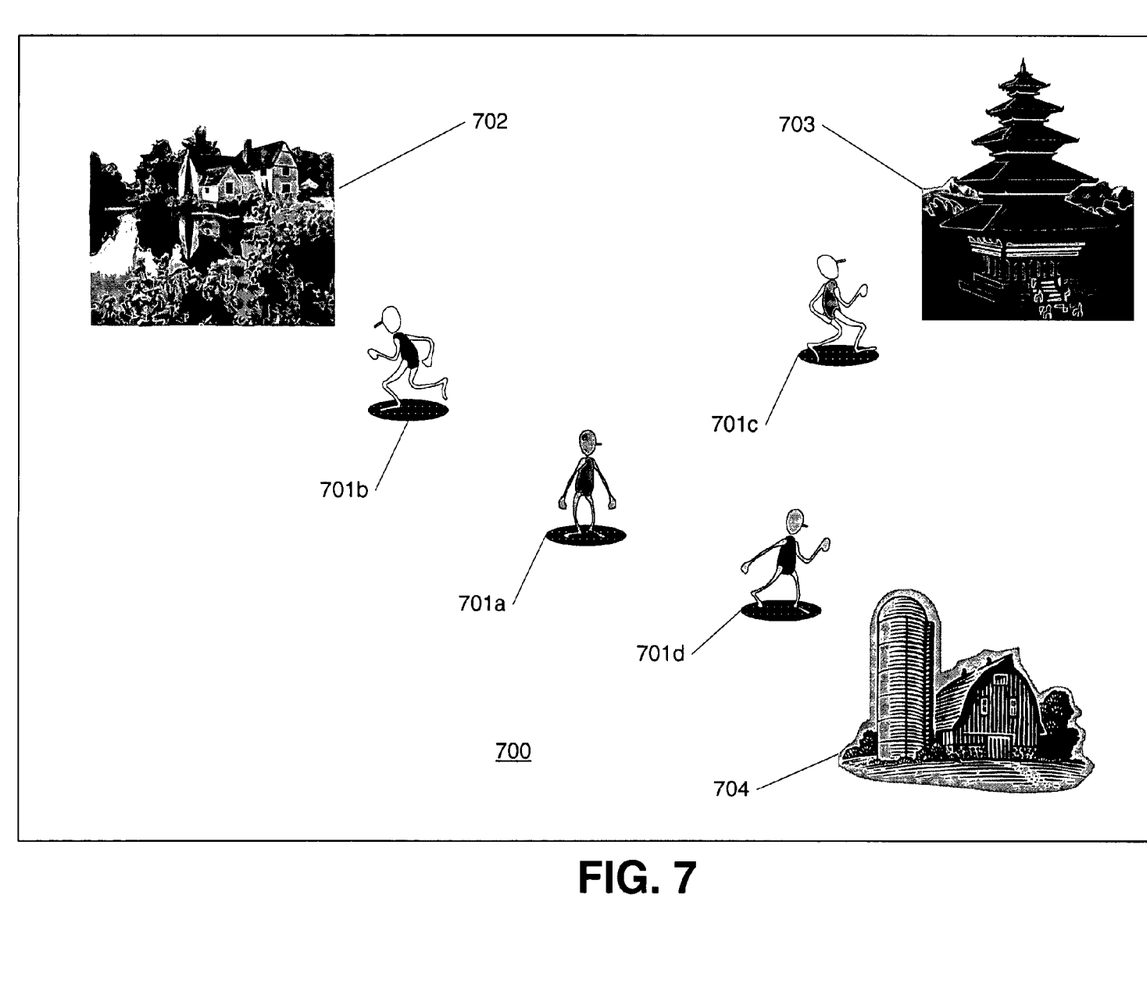
FIG. 7 illustrates an example location scene in which the player's party disperses through a location entered from the map scene.

Upon entering a location, such as town 604, the RPG may change scenes to display a location scene 700, as shown in FIG. 7. The location scene 700 may show a closer, more detailed, view of town 604, and may include icons 702-704 representing areas within town 604 with which the player's characters may interact. As noted above, the player's party may comprise a plurality of individual characters, and upon entering a location, the party may disperse. As shown in FIG. 7, a plurality of icons 701a-d may be displayed, corresponding to the various characters in the player's party, and the various characters may be shown to be dispersing to various areas within town 604 by, for example, animation, fading, etc.

The dispersal may be based on attributes of the individual characters. For example, a character who is a drunkard might automatically move towards the town pub or bar. A religious character 701c might go to the town's temple 703. The various preferences and inclinations of the characters may be stored as data structures in the game device's memory, such as RAM 206, disk drive 208, system memory 530, etc. The data structures may be in any form, and may contain the types of data shown in FIG. 8. For example, there may be a data record (801-804) for each of four characters in the player's party. The records may store a character identification 801a (e.g., a character name). The records may store character interest 801b information, which may identify particular interests of the character, such as types of objects, areas, creatures, personalities, etc. that may attract the character. The interest information may identify types of interest, as well as a degree of interest (e.g., weak interest, strong interest, etc.). Similarly, the records may also store aversion information 801c, identifying aversions of the character, such as types of objects, areas, creatures, personalities, etc. that the character does not like, and may also identify a degree of aversion (e.g., weak diversion, strong diversion, etc.). The records may also store appearance information 801d, identifying the physical appearance of the character (e.g., skin color, hair, eye, etc.), equipment information 801e identifying the equipment carried by and/or equipped by the character, and other information 801f identifying any other desired attribute of the character.

Figure 8:
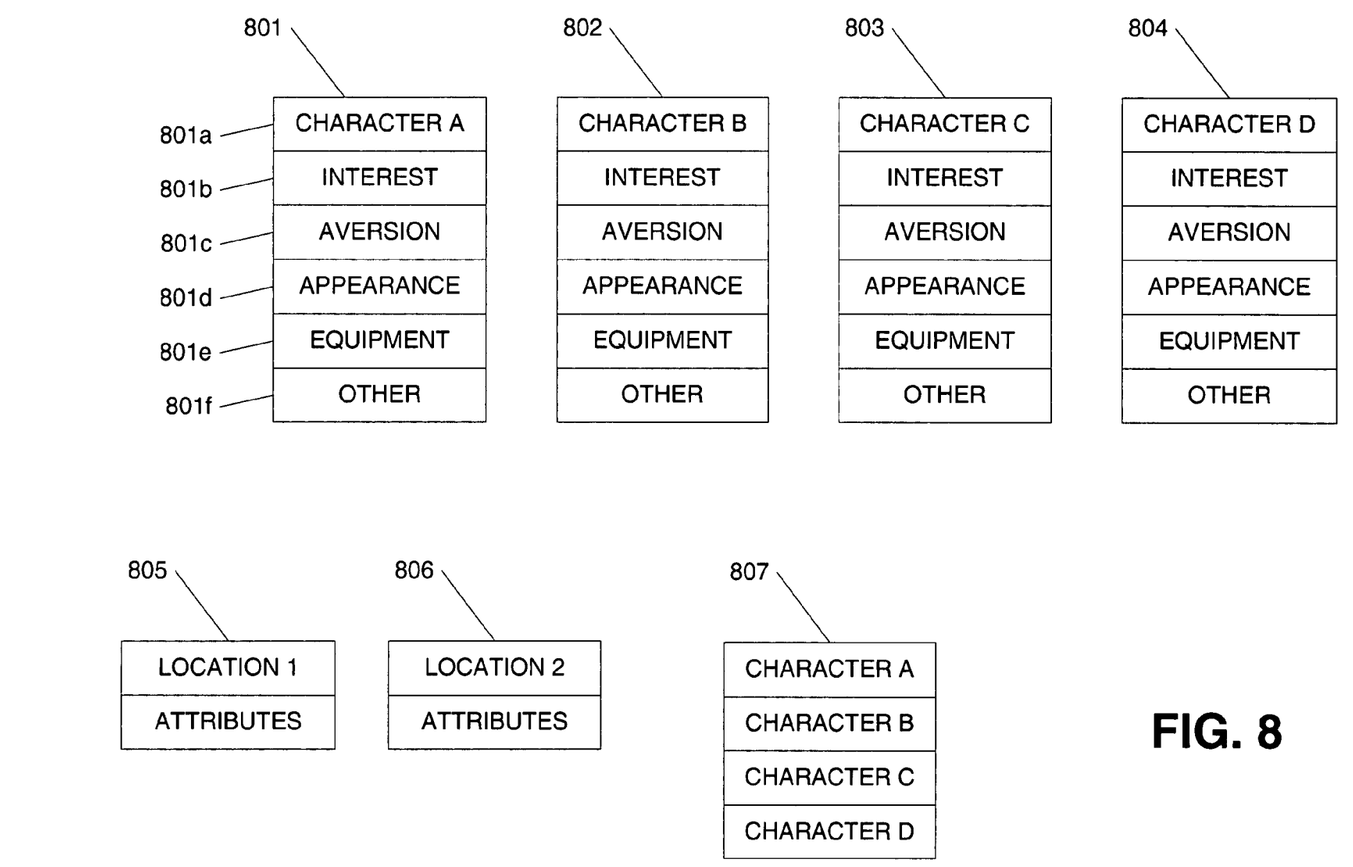
FIG. 8 illustrates example data structures and contents that may be stored to facilitate one or more features described herein.

The RPG may also store data structures 805, 806 identifying attributes of the various elements in the location, such as areas of town. For example, a first location 805 may correspond to a temple 703, and the location data structure may indicate this location type. By comparing the character attributes with the location attributes, the RPG may automatically determine which location or area a particular character would like to visit upon entering a town.

When the character 602 enters the location, such as town 604, the player may be given the option of selecting a character from the party to control. For example, the player may be presented with a list of the available characters, and the player may choose one to control while in the town. While in the location or town, the player may be given the option of dynamically switching control to one of the other characters in the party. For example, the system may store a character data structure 807 listing the party characters, and by pressing a predetermined button on controller 104, the player may switch control to the next character in the list.

Figure 9A:
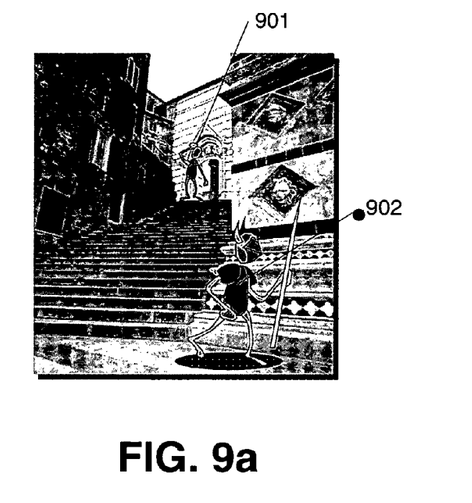
FIGS. 9*a-d* illustrate example screens in which a player switches character control.
Figure 9B:
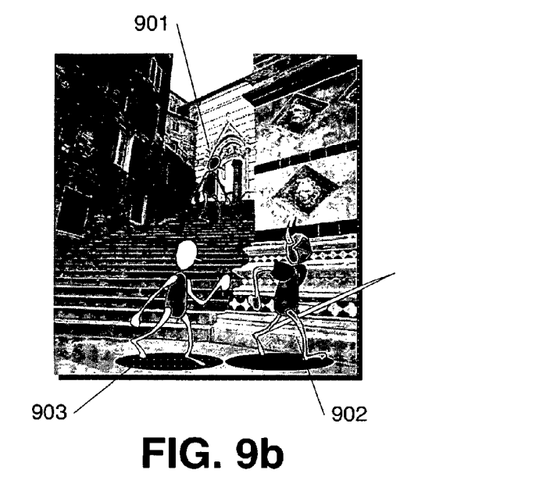
Figure 9C:
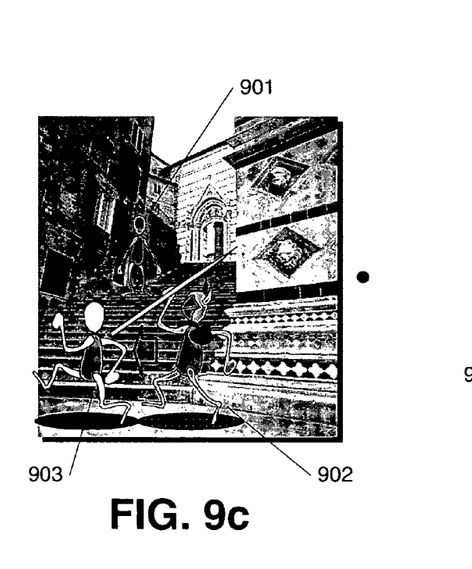
Figure 9D:
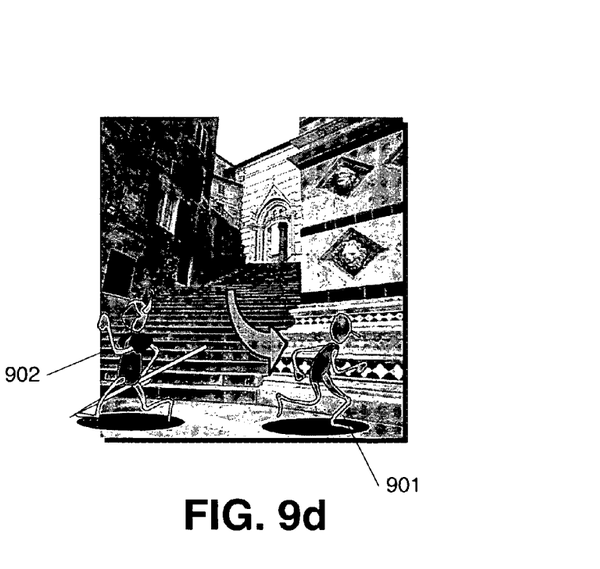

Switching control between characters may allow the player to experience a given event from a different point of view. For example, if the player is using a first character and encounters an obstacle, the player can switch control to another character to help in the situation. FIGS. 9a-d illustrate an example sequence of screens in which this occurs. First, in FIG. 9a, the player's character 901 may encounter an enemy security guard 902 that the character 901 cannot pass. By switching control to a second character 903, the player can bring the second character 903 into the scene to distract the guard 902, as shown in FIG. 9b. The player may direct the second character 903 to lure the guard 902 away from his post, as shown in FIG. 9c. With the guard 902 away from his post, the player may then switch control back to the first character 901 to proceed past, unhindered by the guard 902.

In the example shown in FIGS. 9a-d, the scene continued to move forward in time after the player switched characters. After switching characters, the first character 901 may simply remain in position until the player switches back to controlling that character. Alternatively, when the player switches characters, the player may elect to travel backwards in time and replay a scene that had previously occurred. For example, had the player attempted to pass guard 902 using character 901, and been unsuccessful (e.g., the guard captures character 901 and places him under arrest), the player may be given the option to switch control to a different character 903 and travel backwards in time to witness the first character 901's unsuccessful attempt, and to try and interfere with that unsuccessful attempt to change its outcome.

This may be accomplished by first recording data identifying the various actions taken by the first character 901 and the guard 902 in the first interaction attempt. Then, when the player switches to character 903, the system can load this recorded data to display the character 901 and guard 902 during the previous interaction, and the player (now in control of second character 902) may move and interact with the previously-recorded scene. Of course, the recorded scene need not occur exactly as it occurred the first time, and the character 901 and/or guard 902 may react to new actions taken by the second character 903. For example, the second time through the interaction, the player may cause character 903 to bump into guard 902 as the guard is capturing character 901, and then cause character 903 to run away. If the guard 902 proceeds to chase character 903, instead of continuing to arrest character 901, the player may then switch control back to player 901 and move that character on through the gate.

Figure 10:
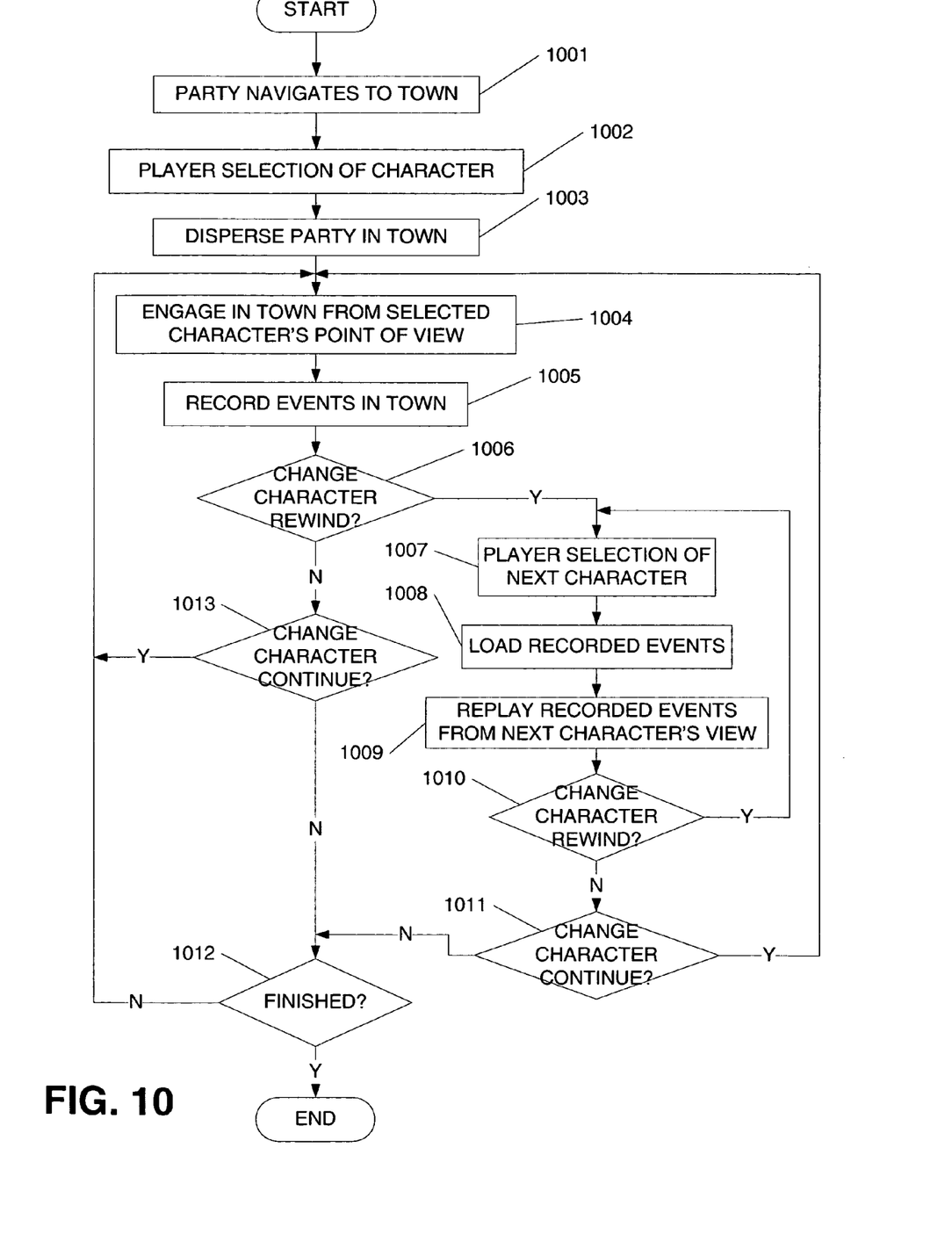
FIG. 10 illustrates an example method employing one or more features described herein.

FIG. 10 illustrates an example method in which one or more of the various features described herein may be implemented. In step 1001, the player may control an icon 602 representing a party of characters, and move the icon through the map scene 601 to enter a town, such as town 604. In step 1002, the player may be given the option of choosing which character in the party the player wishes to control while in the town. This may be done, for example, by displaying a list of available characters to the user and receiving a selection of one.

When the player has selected a character to control, the system may move to step 1003 and show the dispersal of the characters in the party. The characters that were not selected to be controlled by the player may be automatically directed to the areas in town that are most suitable to the character's preferences (e.g., the interests and aversions described above). Then, in step 1004, the player may control the selected character and move about the town under the player's control, interacting with various creatures/characters/objects as desired by the player. During this interaction, the player will be viewing events from the point of view of the first selected character.

In step 1005 (which may alternatively be done as part of step 1004), the various actions of the player and the selected character may be recorded in the system's memory. This recording may store the commands, directions, and actions of the player's controlled character and of the various creatures/characters/objects that the player interacted with.

In step 1006, the system may check to see if the player has entered a command indicating that a change in character and a rewind in time are desired. This may occur when, for example, the player wishes to replay a prior scene from a different character's point of view. If the player wishes to have such a change, the player may select the next character in step 1007. In step 1008, the system may load the previously-recorded data for the player's prior interaction (e.g., the character 901's unsuccessful attempt to get past guard 902, described above). With the prior interaction loaded, the process may move to step 1009, in which the player has the opportunity to replay the prior scene from a different character's point of view. For example, during this replaying of the scene, the player may control the different character and attempt to interrupt or alter the prior scene (e.g., the distraction of the guard 902 described above).

The rewinding and replaying of a scene can occur multiple times. In step 1010, the system may check to see if the user wishes to try the 'scene again from yet another character's point of view. For example, the prior step 1009 may also include a recording of the prior scene, recording the initial attempt (e.g., from step 1004) as well as the different character's attempt (e.g., from step 1009). If, in step 1010, the player wishes to switch to another character (e.g., the same character used in step 1004, or a completely different character), the system may return to step 1007 to retry the scene from a different character's perspective.

If, in step 1010, the player did not wish to rewind time, the system may check in step 1011 to determine whether the player wished to switch characters and continue the current time line, thereby continuing the scene from its current position. If the player wishes to make such a change, the process may return to step 1004 to continue the scene. If the player did not wish to change characters, then the process may move to step 1012 to determine whether the player is finished with the given scene. If the player is finished, the process ends. If the player is not finished, the process returns to step 1004 to continue the scene.

If, in step 1006, the player did not wish to rewind time, the process may move to step 1013 to check whether the player wishes to change characters and continue the scene. If the player wished to continue, the process may return to step 1004 to do so. If the player did not, the process may move to step 1012 to determine whether the player is finished with the current scene, as described above.

By allowing players to switch between characters, the RPG may provide for a more engaging experience. To facilitate this, the game software may include cutscene data to show a single interaction or event from the point of view of many different characters. The system may simply select a cutscene according to the controlled character's identity. To allow interactive replays of prior interactions, the system may store prior interactions in a manner that permits alterations when the interactions are replayed. For example, the system may store predefined behavior algorithms for the characters in the scene, and may store commands to cause the characters to perform as with the initial interaction. Then, when the interaction is replayed, the same commands may be supplied to the behavior algorithms, but if the player causes a second character to interrupt or alter those commands, the resulting behavior (and the interaction) will change in response.

The features described above are preferably encoded in computer software as executable instructions that can be executed on a computing device, such as a personal computer or video game console, to result in the display of the screens shown in the figures. The executable instructions may be stored on a computer-readable medium, such as one or more computer disks, RAMs, CD-ROMs, DVDs, game cartridges, etc. Also, although various features are described above, it is not necessary to practice them all in the same embodiment. Instead, various combinations and subcombinations may be implemented as desired, and the true scope of the present invention should only be limited by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim the following:

1. One or more computer-readable media storing computer-executable instructions for performing the following steps in a video game:
    displaying a map scene in a role-playing-game, including a single player-controlled icon, the single player-controlled icon representing a plurality of characters;
    receiving a user request to move the single player-controlled icon into a location on the map scene;
    in response to the single player-controlled icon entering the location on the map scene, displaying a closer view of the location on the map scene, the closer view including a plurality of different areas in the location on the map scene;
    accessing stored preference information for each of the plurality of characters; and
    automatically dispersing the plurality of characters to the different areas in the location on the map scene, the dispersal being based at least in part on the preference information;
    receiving a user identification of a selected first one of the plurality of characters for control in at least one of the different areas;
    involving the first character in a first interaction in the at least one of the different areas;
    recording the first interaction involving the first character;
    receiving, following the first interaction, a user command to switch control to a second one of the plurality of characters and to rewind time to replay the first interaction from the second character's point of view; and
    receiving user commands to involve the second character in a second interaction, the user commands controlling the second character to alter a previous outcome of the first interaction.

2. The media of claim 1, further comprising instructions for receiving another user request to replay the second interaction using a third character, and replaying the second interaction in response to the another user request.

3. One or more computer-readable media storing computer-executable instructions for performing the following steps in a video game:
- displaying a scene having a first player-controlled character and a computer-controlled character;
- in response to player commands, displaying an interaction between the first player-controlled character and the computer-controlled character, and recording said interaction;
- in response to a user command, switching player control to a second character; and
- replaying said interaction through the second character's point of view, wherein replaying said interaction further comprises instructions for altering a previous outcome of said recorded interaction in response to actions of the second character.

4. The media of claim 3, further comprising instructions for recording said replayed interaction having said altered outcome.

5. The media of claim 4, further comprising instructions for receiving a user command to change player control to a third character, and replaying said replayed interaction from the third character's point of view.

6. The media of claim 3, further comprising instructions for receiving additional user commands to switch control back to the first character after said step of replaying.

7. The media of claim 3, further comprising instructions for receiving additional user commands to switch player control to a third character after said step of replaying.

8. The media of claim 3, further comprising instructions for:
- moving an icon representing a plurality of characters through a map scene in response to user commands; and
- in response to the icon entering a predetermined area in the map scene, automatically dispersing said icon into a plurality of icons representing said characters.

9. The media of claim 8, wherein said automatic dispersal is based on stored preference data for said characters.

10. The media of claim 8, wherein said predetermined area represents a town within said game.

11. A method comprising: displaying, via a display device, a scene having a first player-controlled character and a computer-controlled character; displaying an interaction between the first player-controlled character and the computer-controlled character, and recording the interaction; in response to a user command, switching player control to a second character; and replaying the interaction through a point of view of the second character; and altering a previous outcome of the interaction in response to actions of the second character.

12. The method of claim 11, further comprising recording the replayed interaction having an altered outcome.

13. The method of claim 12, further comprising receiving a second user command to change player control to a third character, and replaying the replayed interaction from a point of view of the third character.

14. The method of claim 11, further comprising receiving additional user commands to switch control back to the first character after the replaying.

15. The method of claim 11, further comprising: moving an icon representing a plurality of characters through a map scene in response to user commands; and in response to the icon entering a predetermined area in the map scene, automatically dispersing the icon into a plurality of icons representing the plurality of characters.

16. The method of claim 15, wherein automatic dispersal is based on stored preference data for the plurality of characters.

17. The method of claim 15, wherein the predetermined area represents a town within a game.

* * * * *